United States Patent
Ohta et al.

(10) Patent No.: US 6,257,202 B1
(45) Date of Patent: Jul. 10, 2001

(54) THROTTLE VALVE FOR AN AIR FLOW CONTROL ASSEMBLY

(75) Inventors: Hirohisa Ohta; Kenichi Ohno; Teruhiko Moriguchi; Takeshi Sugiyama, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/584,846

(22) Filed: Jun. 1, 2000

(30) Foreign Application Priority Data

Jun. 7, 1999 (JP) ................................................. 11-159654

(51) Int. Cl.$^7$ ....................................................... F02D 9/08
(52) U.S. Cl. ............................................. 123/337; 251/306
(58) Field of Search ............................. 123/337; 251/306

(56) References Cited

U.S. PATENT DOCUMENTS

| | | | | |
|---|---|---|---|---|
| 3,620,195 | * | 11/1971 | Lamm | 123/337 |
| 4,438,745 | * | 3/1984 | Watanabe | 123/337 |
| 4,892,288 | * | 1/1990 | Norbury, Jr. et al. | 251/306 |
| 4,972,815 | * | 11/1990 | Yamamoto et al. | 123/337 |
| 5,081,972 | * | 1/1992 | Daly et al. | 123/337 |
| 5,148,787 | * | 9/1992 | Ganser | 123/337 |
| 5,758,623 | * | 6/1998 | Nitta et al. | 123/337 |

FOREIGN PATENT DOCUMENTS 9-49443    2/1997   (JP) .

* cited by examiner

Primary Examiner—John Kwon
(74) Attorney, Agent, or Firm—Sughrue, Mion, Zinn, Macpeak & Seas, PLLC

(57) ABSTRACT

A disk-shaped throttle valve composed of an injection-molded resin having first main surface and a second main surface which are generally parallel includes a circular groove or semi-circular grooves centered on a gate resin portion where the resin is injected. The first main surface may also include a recess portion around the gate resin portion positioned such that the gate resin portion does not project beyond the first main surface. An accumulated resin portion may also be disposed on the second main surface opposite the gate resin portion, the accumulated resin portion being formed as a protrusion positioned such that an apex portion does not project beyond the second main surface.

2 Claims, 4 Drawing Sheets

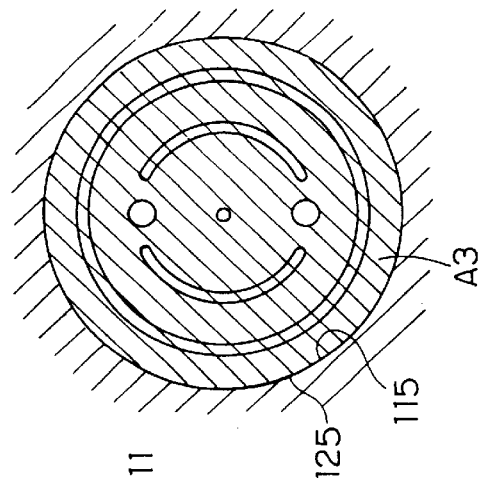
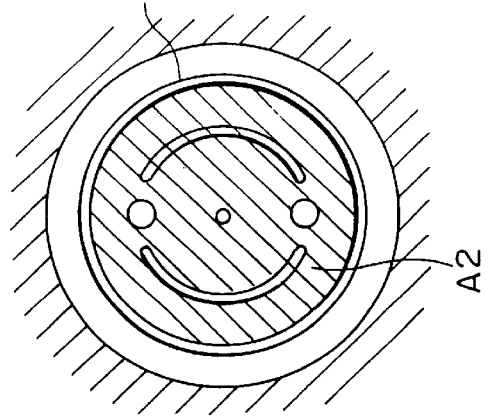
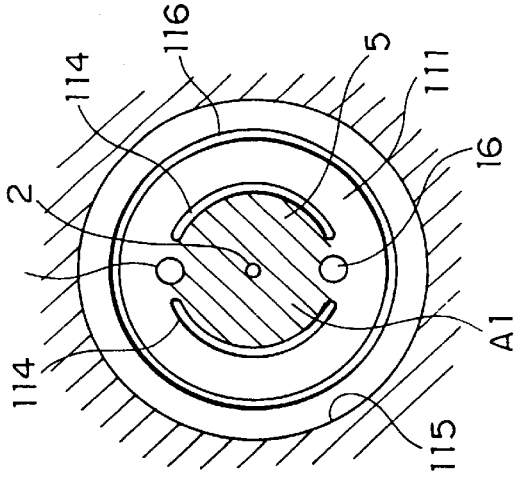
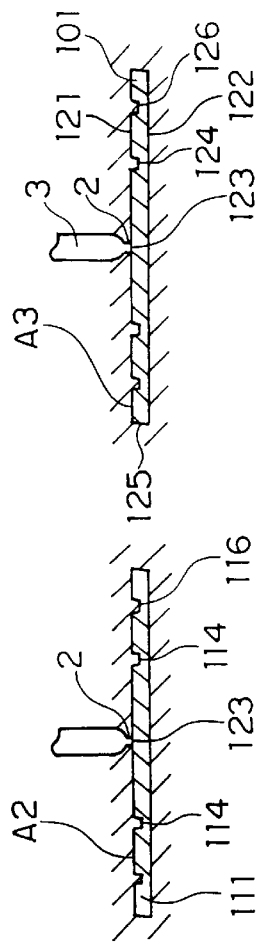
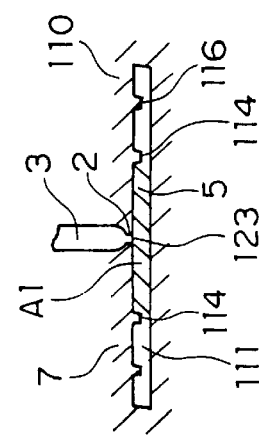

THROTTLE VALVE FOR AN AIR FLOW CONTROL ASSEMBLY

BACKGROUND OF THE INVENTION

1. Field of the Invention

The present invention relates to a throttle valve used in an air flow control assembly for adjusting the amount of air flowing through an air intake passage of an internal combustion engine.

2. Description of the Related Art

An example of a conventional air flow control assembly for an internal combustion engine is shown in FIG. 12.

In the figure, a generally cylindrical rod-shaped throttle shaft 12 is rotatably supported at both ends by a throttle body 6 having a generally cylindrical inner wall 6a. A long, thin rectangular groove is disposed in the throttle shaft 12, and a disk-shaped throttle valve 1 composed of injection-molded resin is inserted into the groove and secured to the throttle shaft 12 by screws (not shown). The throttle valve 1 rotates together with the throttle shaft 12 and adjusts the amount of air flowing into a combustion chamber (not shown) of the internal combustion engine by changing a gap G between the throttle valve 1 and the inner wall 6a of the throttle body 6.

Next, the method for manufacturing this throttle valve 1 by injection molding will be explained.

FIG. 10 is a cross section explaining the process of injection molding the throttle valve 1 by injecting a resin 5 into an injection mold 10 in the shape of the throttle valve 1.

In the figure, a flat disk-shaped cavity 11 for forming the throttle valve 1 is disposed in the injection mold 10. An injection mold gate portion 2, which is a small-diameter cylindrical opening for injecting the resin 5 into the cavity 11, is disposed on one side of the center of the cavity 11, and the resin 5 is injected from a runner 3, which is a large-diameter cylindrical opening, through the injection mold gate portion 2 to fill the inside of the cavity 11.

FIG. 11 is a plan showing the resin 5 as it fills the inside of the cavity 11 of the injection mold 10.

In the figure, the resin 5 is injected into the cavity 11 through the injection mold gate portion 2 and spreads radially from there. Cylindrical pins 16 are disposed inside the cavity 11 to form shaft-securing bores for passage of the screws securing the throttle valve 1 to the throttle shaft 12.

To permit the engine to perform stable low-fuel-consumption idling, it is necessary to suppress the amount of air leakage, which is the amount of inflow air leaking through the gap G, when the throttle valve 1 is fully closed, that is, the state in which the throttle valve 1 has rotated to be perpendicular to the inner wall 6a.

However, since the precision of outside diameter dimensions of the throttle valve 1 has been insufficient, the gap G could not be adequately reduced, increasing the air leakage when the throttle valve 1 is fully closed, and making it difficult to achieve stable low-fuel-consumption idling.

It is necessary to improve precision of the outside diameter of the throttle valve 1 to reduce air leakage, but as shown in FIG. 11, since there is no means provided for controlling the flow of the resin 5 injected into the cavity 11 through the injection mold gate portion 2, the speed of the resin 5 flowing through the cavity 11 is not uniform. For that reason, the time at which the resin 5 reaches different positions on the outside diameter mold portion 15, which forms the outside diameter portion of the throttle valve 1, is irregular, making the density to which the resin 5 fills the inside of the cavity 11 nonuniform due to irregularities in the hardening time of the resin 5, thereby leading to deterioration in the precision of the outside diameter dimensions, which includes the outside diameter dimensions, outside diameter roundness, etc., of the throttle valve 1. Conventionally, the irregularities in the outside diameter dimensions of injection-molded throttle valves 1 are in the order of one percent of the outside diameter dimensions, which is approximately ten times the irregularities in outside diameter dimensions of generally-used conventional throttle valves in which metal material is machined.

In addition, when the cross-sectional shape is asymmetrical as in the throttle valve 21 shown in FIG. 13, the time at which the resin 5 reaches different positions on an outside diameter mold portion 22 of the throttle valve 21 is even more irregular, and the deterioration in the precision of the outside diameter dimensions has been significant.

Furthermore, as shown in FIG. 11, during the process of injecting the resin 5, the resin 5 which has started to harden and build up in the vicinity of the injection mold gate portion 2 flows radially outwards through the cavity 11, but this partially-hardened resin is resistant and causes the flow of the resin 5 being injected into the cavity 11 after it to be non-uniform, leading to deterioration in the precision of the outside diameter dimensions of the throttle valve 21.

FIG. 14 is a cross section showing a throttle valve 1 manufactured by injecting the resin 5 into the injection mold 10 shown in FIG. 10.

In the figure, some of the resin from the injection mold gate portion 2 of the injection mold 10 has been left behind and formed a burr 13 at a gate resin portion 17 in the center of the throttle valve 1 where the resin was injected during injection molding. Such burrs 13 catch on the groove in the throttle shaft 12 when the throttle valve 1 is being inserted into and secured to the groove in the throttle shaft 12, and it has not been easy to install the throttle valve 1 in the throttle shaft 12.

SUMMARY OF THE INVENTION

The present invention aims to solve the above problems and an object of the present invention is to provide a throttle valve for an air flow control assembly in which dimensional precision is increased, burr removal is eliminated, and assembly in the throttle shaft is made superior by a simple construction.

In order to achieve the above object, according to one aspect of the present invention, there is provided a throttle valve for an air flow control assembly being a disk-shaped throttle valve composed of an injection-molded resin having first and second main surfaces which are generally parallel, the throttle valve including:

a gate resin portion disposed on the first main surface where the resin is injected; and at least one groove disposed surrounding the gate resin portion following a circle centered on the gate resin portion on at least one main surface selected from the first and second main surfaces.

In the throttle valve for an air flow control assembly according to the present invention, the first main surface may also include a recess portion disposed around the gate resin portion, the recess portion being positioned so that the gate resin portion does not project beyond the first main surface.

According to another aspect of the present invention, there is provided a throttle valve for an air flow control assembly being a disk-shaped throttle valve composed of an injection-molded resin having first and second main surfaces which are generally parallel, the throttle valve including:

a gate resin portion disposed on the first main surface where the resin is injected; and an accumulated resin portion formed as a protrusion disposed on the second main surface in a position opposite the gate resin portion.

In the throttle valve for an air flow control assembly according to the present invention, the second main surface may also include a recess portion disposed around the accumulated resin portion, and the accumulated resin portion may extend from a bottom surface of the recess portion, the accumulated resin portion being positioned such that an apex portion thereof does not project beyond the second main surface.

BRIEF DESCRIPTION OF THE DRAWINGS

FIGS. 1 to 6 are plans and cross sections explaining the manufacturing process for a throttle valve for an air flow control assembly according to Embodiment 1 of the present invention;

DETAILED DESCRIPTION OF THE PREFERRED EMBODIMENTS

Embodiment 1

Figure 7:
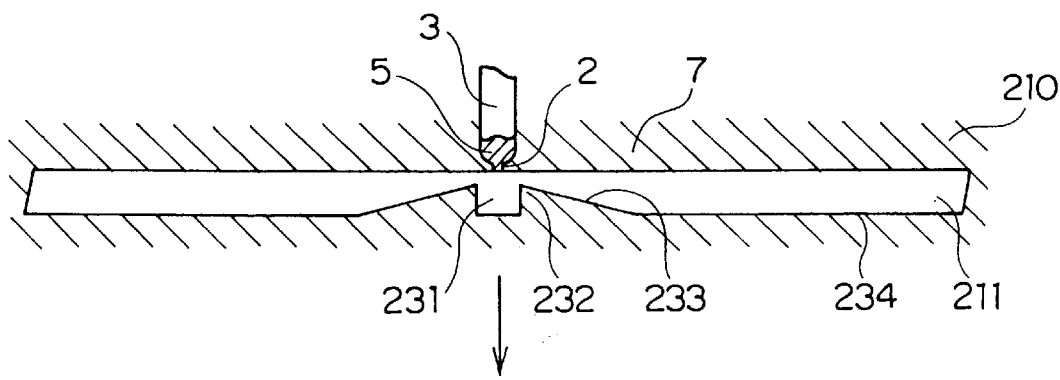
FIGS. 7 and 8 are cross sections explaining the manufacturing process for a throttle valve for an air flow control assembly according to Embodiment 2 of the present invention.

FIGS. 1 to 6 are a set of cross sections and plans explaining the manufacturing process for a throttle valve for an air flow control assembly according to Embodiment 1 of the present invention. FIGS. 1 to 3 are plans showing resin 5, which has been injected into a cavity 111 of an injection mold 110, spreading radially, and FIGS. 4 to 6 are cross sections of FIGS. 1 to 3. Hereinafter, parts and portions of the figures which are the same as or equivalent to parts and portions of FIGS. 10 to 14 will be given the same numbering and duplicate explanations will be omitted.

In FIG. 4, a disk-shaped cavity 111 for injection molding a disk-shaped throttle valve 101 composed of injection-molded resin having a first main surface 121 and a second main surface 122 which are approximately parallel to each other is disposed in an injection mold 110, as shown in FIG. 6. An injection mold gate portion 2, which is an entrance for injecting a resin 5 into the cavity 111 is disposed in the center of the cavity 111. Furthermore, two arc-shaped semicircular protrusions 114, whose cross sections are trapezoidal and whose shape is composed of part of a circle concentrically centered on the injection mold gate portion 2, are disposed on an inner wall on the same side of the cavity 111 as the injection mold gate portion 2. Cylindrical pins 16 are disposed between the semicircular protrusions 114 to form shaft-securing bores for passage of the screws securing the finished throttle valve 101 to the throttle shaft 12. A circular protrusion 116 having a trapezoidal cross section is disposed radially outside the semicircular protrusions 114 so as to also be concentrically centered on the injection mold gate portion 2.

The resin 5 injected into the cavity 111 through the injection mold gate portion 2 spreads radially, as shown in FIG. 1, and fills a first area A1 bounded by the semicircular protrusions 114 and the pins 16. After filling the first area A1, the resin 5 spreads within the range of a second area A2 bounded by the circular protrusion 116, then after filling the second area A2, the resin 5 fills a third area A3, which is an area up to an outside diameter mold portion 115 of the injection mold 110 forming an outside diameter portion of the throttle valve 101, whereby the resin 5 charges the whole of the inside of the cavity 111 to form the disk-shaped throttle valve 101 composed of injection-molded resin shown in FIG. 6.

The shape of the injection-molded throttle valve 101 is shown in FIG. 6.

In FIG. 6, a gate resin portion 123, which is a portion where the resin 5 is injected at a position near the injection mold gate portion 2 of the injection mold 110, is formed on the first main surface 121 of the throttle valve 101. Furthermore, two semicircular grooves 124 and a circular groove 126, which are trapezoidal grooves disposed surrounding the gate resin portion 123 following circles centered on the gate resin portion 123, are formed in the first main surface 121 of the throttle valve 101 by the semicircular protrusions 114 and the circular protrusion 116.

Because the throttle valve 101 for an air flow control assembly according to this embodiment is constructed in this manner, the time at which the resin 5 reaches different positions on the outside diameter mold portion 115 of the injection mold 110 is substantially the same and irregularities in the hardening time of the resin are reduced, thereby improving the dimensional precision of the throttle valve 101, particularly the precision of outside diameter dimensions and roundness of an outside diameter portion 125.

Embodiment 2

Figure 8:
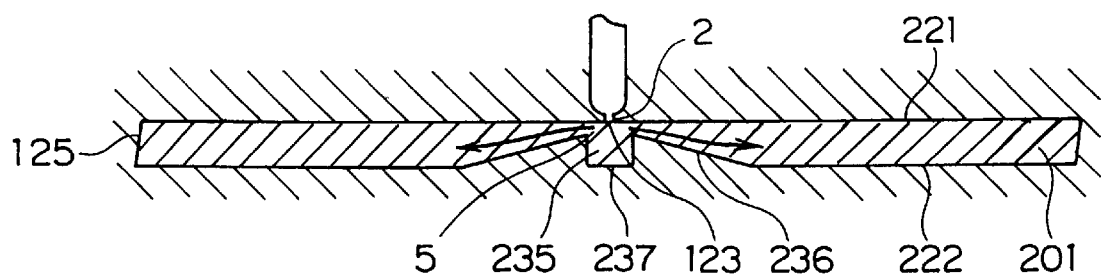

FIGS. 7 and 8 are cross sections explaining the manufacturing process for a throttle valve 201 for an air flow control assembly according to Embodiment 2 of the present invention. FIG. 7 shows the state before the resin 5 is injected into a cavity 211 of an injection mold 210, and FIG. 8 shows the state as the resin 5 is being injected into the cavity 211.

A cylindrical recess portion 231 is disposed in a position opposite the injection mold gate portion 2 of the cavity 211. A gently inclined surface 233 spreads radially outwards in a conical shape from a shoulder portion 232 of the recess portion 231 and connects to a flat surface 234.

As shown in FIG. 7, before injection molding, the resin 5 which is about to be injected is held in the injection mold gate portion 2 in a partially hardened state. As injection of the resin 5 into the cavity 211 begins, the partially-hardened resin 5 which has poor fluidity accumulates in the recess portion 231, and then the fluid resin 5 spreads radially as indicated by arrows in FIG. 8 to form the throttle valve 201.

In FIG. 8, the throttle 201 has a first main surface 221 and a second main surface 222 which are approximately parallel to each other, and a gate resin portion 123 is formed on the first main surface 221 at a position near the injection mold gate portion 2 of the injection mold 210. An accumulated resin portion 235 shaped as a cylindrical protrusion is formed on the second main surface 222 of the throttle valve 201 at a position opposite the gate resin portion 123. A recess portion 236 which spreads radially outwards and becomes gently shallower in a radially inward direction is formed around the accumulated resin portion 235. In addition, an apex portion 237 of this accumulated resin portion 235 projecting from a bottom portion of the recess portion 236 is positioned so as not to project beyond the second main surface 222.

Because the throttle valve 201 for an air flow control assembly according to this embodiment is constructed in this manner, the resin 5 which has started to harden in the vicinity of the injection mold gate portion 2 before injection molding is pushed into the recess portion 231 so as not to flow into the outside diameter portion 125 of the throttle valve 201, making the flow of resin which spreads radially during the molding of the throttle valve 201 uniform, thereby improving the dimensional precision of the throttle valve 201, particularly the precision of outside diameter dimensions and roundness of the outside diameter portion 125. Because the apex portion 237 of the accumulated resin portion 235 is positioned so as not to project beyond the second main surface 222, mounting of the throttle valve 201 to the throttle shaft 12 is facilitated.

Embodiment 3

Figure 9:
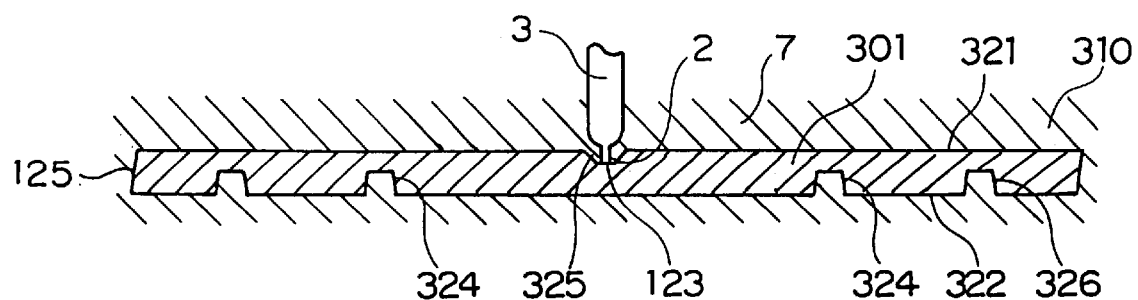
FIG. 9 is a cross section showing an injection mold for molding a throttle valve for an air flow control assembly according to Embodiment 3 of the present invention and the construction of the throttle valve formed thereby.
Figure 10:
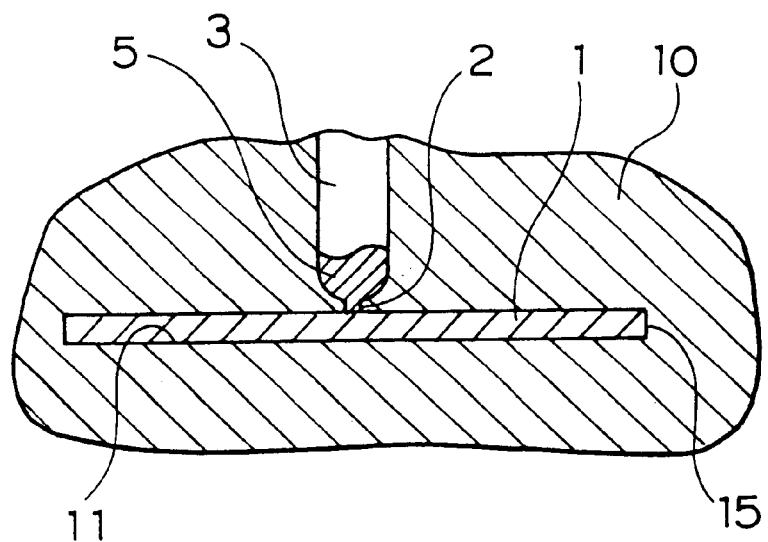
FIG. 10 is a cross section explaining the process of injection molding a conventional throttle valve.
Figure 11:
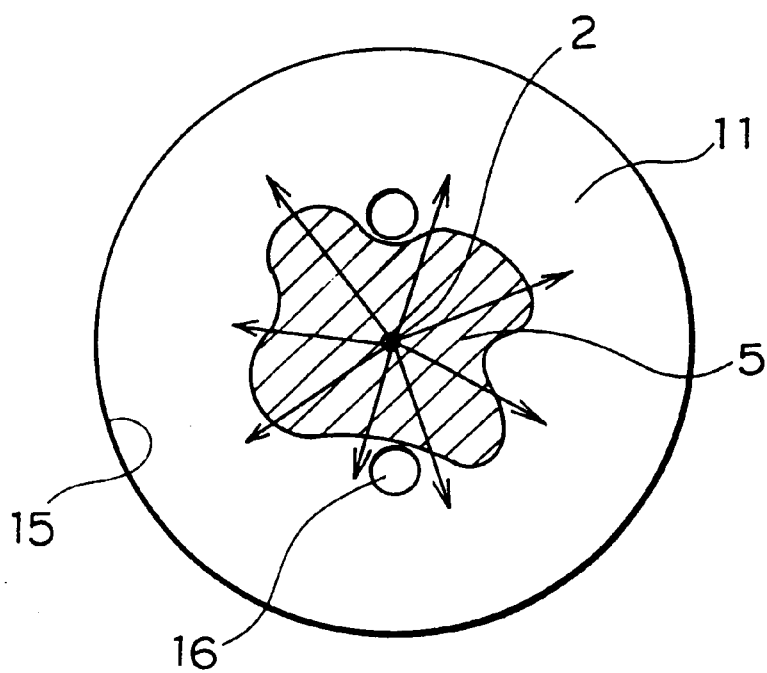
FIG. 11 is a plan showing resin as it fills the inside of an injection mold in the process of injection molding the conventional throttle valve.
Figure 12:
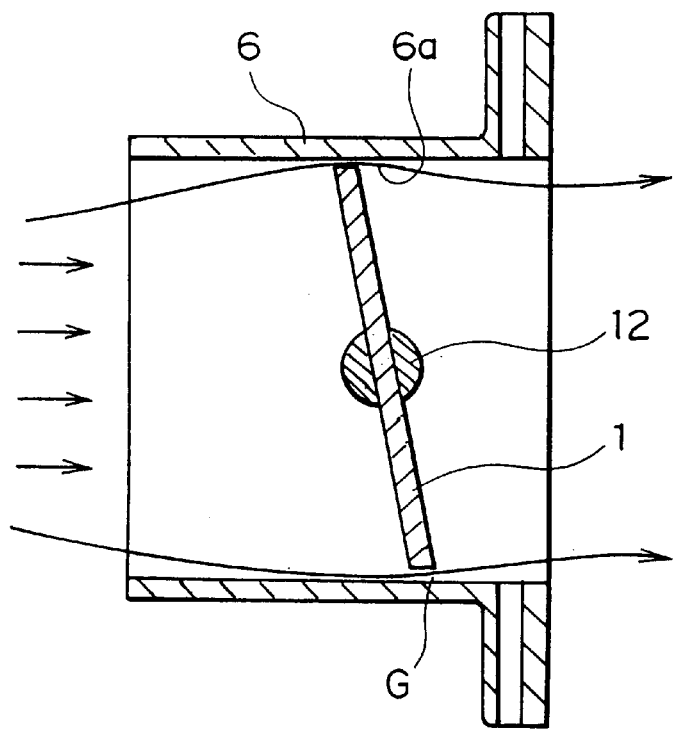
FIG. 12 is a cross section showing the construction of a conventional air flow control assembly.
Figure 13:
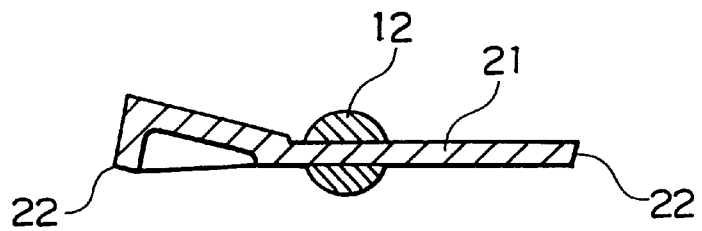
FIG. 13 is a cross section showing the construction of a conventional throttle valve.
Figure 14:
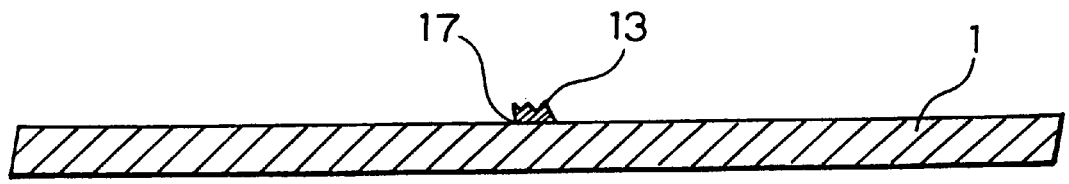
FIG. 14 is a cross section showing the construction of another conventional throttle valve.

FIG. 9 is a cross section showing an injection mold 310 for molding a throttle valve for an air flow control assembly according to Embodiment 3 of the present invention and a throttle valve 301 formed thereby.

In the figure, the positions of two semicircular grooves 324, a circular groove 326 and the gate resin portion 123 of the throttle valve 301 are different from those in the throttle valve 101 in FIG. 6.

More specifically, the two semicircular grooves 324 and the circular groove 326, which are trapezoidal grooves disposed surrounding the gate resin portion 123 following circles centered on the gate resin portion 123 which is disposed in a first main surface 321, are formed in the second main surface 322. Furthermore, a truncated cone-shaped recess portion 325 is disposed in the first main surface 321 around the gate resin portion 123, and the gate resin portion 123 is positioned so as not to project beyond the first main surface 321.

Because the throttle valve 301 for an air flow control assembly according to this embodiment is constructed in this manner, the gate resin portion 123 is positioned so as not to project beyond the first main surface 321, whereby even if a burr occurs at the gate resin portion 123 after injection molding, because the burr will not project beyond the first main surface 321, assembly of the throttle valve 301 and the throttle shaft 12 (see FIG. 12) is facilitated. Furthermore, since the recess portion 325 is disposed around the gate resin portion 123, the thickness of the throttle valve 301 is reduced at this portion, increasing the likelihood that the flow of the resin 5 during injection molding will be non-uniform, but the flow of the resin 5 will be made uniform as in Embodiment 1 because of the presence of the semicircular grooves 324 and the circular groove 326.

According to one aspect of the present invention, there is provided a throttle valve for an air flow control assembly being a disk-shaped throttle valve composed of an injection-molded resin having first and second main surfaces which are generally parallel, the throttle valve including a gate resin portion disposed on the first main surface where the resin is injected, and at least one groove disposed surrounding the gate resin portion following a circle centered on the gate resin portion on at least one main surface selected from the first and second main surfaces, whereby the resin injected through the gate portion flows radially outwards uniformly, reducing irregularities in the hardening time of the resin forming the outside diameter portion of the throttle valve, thereby improving the dimensional precision of the throttle valve, particularly the precision of the outside diameter dimensions and the outside diameter roundness.

In the throttle valve for an air flow control assembly according to the present invention, because the first main surface may also include a recess portion disposed around the gate resin portion, the recess portion being positioned so that the gate resin portion does not project beyond the first main surface, even if a burr forms at the gate resin portion, there is no need to remove the burr, improving the mounting of the throttle valve.

According to another aspect of the present invention, there is provided a throttle valve for an air flow control assembly being a disk-shaped throttle valve composed of an injection-molded resin having first and second main surfaces which are generally parallel, the throttle valve including a gate resin portion disposed on the first main surface where the resin is injected, and an accumulated resin portion formed as a protrusion disposed on the second main surface in a position opposite the gate resin portion, whereby partially-hardened resin which is injected at the commencement of injection molding is pushed into the recess and does not flow to the outside diameter portion of the throttle valve, making the flow of resin uniform during molding, thereby improving the dimensional precision of the throttle valve, particularly the precision of the outside diameter dimensions and the outside diameter roundness.

In the throttle valve for an air flow control assembly according to the present invention, the second main surface may also include a recess portion disposed around the accumulated resin portion, and the accumulated resin portion may extend from a bottom surface of the recess portion, the accumulated resin portion being positioned such that an apex portion thereof does not project beyond the second main surface, thereby facilitating the mounting of the throttle valve to the throttle shaft.

What is claimed is:

1. A throttle valve for an air flow control assembly being a disk-shaped throttle valve composed of an injection-molded resin having first and second main surfaces which are generally parallel, said throttle valve comprising:
   a gate resin portion disposed on said first main surface where said resin is injected; and
   at least one groove disposed surrounding said gate resin portion following a circle centered on said gate resin portion on at least one main surface selected from said first and second main surfaces.

2. The throttle valve for an air flow control assembly according to claim 1 wherein said first main surface comprises a recess portion disposed around said gate resin portion, said recess portion being positioned such that said gate resin portion does not project beyond said first main surface.

* * * * *